US012100571B2

(12) United States Patent
Tanabe et al.

(10) Patent No.: US 12,100,571 B2
(45) Date of Patent: Sep. 24, 2024

(54) X-ray TUBE DEVICE AND X-ray CT APPARATUS

(71) Applicant: FUJIFILM Healthcare Corporation, Kashiwa (JP)

(72) Inventors: Yutaro Tanabe, Kashiwa (JP); Kimihiro Nakayama, Kashiwa (JP); Ren Sonoda, Kashiwa (JP); Yoshitaka Seki, Kashiwa (JP)

(73) Assignee: FUJIFILM Corporation, Chiba (JP)

( * ) Notice: Subject to any disclaimer, the term of this patent is extended or adjusted under 35 U.S.C. 154(b) by 198 days.

(21) Appl. No.: 17/839,540

(22) Filed: Jun. 14, 2022

(65) Prior Publication Data

US 2022/0415601 A1 Dec. 29, 2022

(30) Foreign Application Priority Data

Jun. 25, 2021 (JP) ................................ 2021-105268

(51) Int. Cl.
*H01J 35/10* (2006.01)

(52) U.S. Cl.
CPC ... *H01J 35/1024* (2019.05); *H01J 2235/1053* (2013.01)

(58) Field of Classification Search
CPC .................. H01J 35/10; H01J 35/1024; H01J 2235/1053; A61B 6/032; A61B 6/035; A61B 6/102; A61B 6/40; A61B 6/44; A61B 6/4429
See application file for complete search history.

(56) References Cited

FOREIGN PATENT DOCUMENTS

| | | |
|---|---|---|
| JP | S62-037872 U | 3/1987 |
| JP | H06-058547 U | 8/1994 |
| JP | 2000-208078 | 7/2000 |
| JP | 2013-174303 A | 9/2013 |
| JP | 2017-091881 A | 5/2017 |

OTHER PUBLICATIONS

Japanese official action dated Oct. 24, 2023 (and machine translation) in connection with Japanese Patent Application No. 2021-105268.

*Primary Examiner* — Jurie Yun
(74) *Attorney, Agent, or Firm* — Paul Teng

(57) ABSTRACT

An X-ray tube device capable of preventing a holder holding a bearing from suffering damage, and an X-ray CT apparatus including the X-ray tube device are provided. The X-ray tube device includes: a cathode that produces an electron beam; an anode that produces X rays upon irradiation with the electron beam; a rotating portion that supports and rotates the anode; bearings that are placed at a predetermined distance from each other in a direction of a rotation axis of the rotating portion, each of the bearings having an outer ring and an inner ring between which rolling elements are sandwiched; and a holder that holds the outer rings. The holder has an inner wall that is spaced from an edge of the outer ring.

12 Claims, 6 Drawing Sheets

X-ray TUBE DEVICE AND X-ray CT APPARATUS

CLAIM OF PRIORITY

The present application claims priority from Japanese Patent Application JP 2021-105268 filed on Jun. 25, 2021, the content of which is hereby incorporated by reference into this application.

BACKGROUND OF THE INVENTION

The present invention relates to an X-ray tube device and an X-ray CT (Computed Tomography) apparatus and, more particularly, to a bearing used in a rotating anode X-ray tube device.

The X-ray CT apparatus includes an X-ray tube device that emits X rays to an object under examination, and an X-ray detector that detects the X rays which have passed through the object under examination. The X-ray CT apparatus rotates the X-ray tube device and the X-ray detector around the object under examination and uses projection data thus obtained in many directions to generate a tomographic image of the object under examination. The generated tomographic image depicts a shape of an organ within the object under examination for use in diagnostic imaging.

The X-ray CT apparatus uses a rotating anode X-ray tube device which rotates an anode. In the rotating anode X-ray tube device, bearings are placed at a predetermined distance from each other in a direction of a rotation axis of a rotating portion that supports and rotates the anode. Due to heat transfer from the anode irradiated with electron beam when X rays are produced, the rotating portion undergoes changes in temperature and repeatedly experiences thermal expansion and thermal contraction. With the thermal expansion and thermal contraction of the rotting portion, the bearings sliding in the direction of the rotation axis can catch on a holder that holds the bearings.

Japanese Unexamined Patent Application Publication No. 2000-208078 discloses an X-ray tube device in which the outer peripheral face of a bearing is coated with a thin film of diamond-like carbon and/or lead in order to achieve smooth sliding of the bearing in relation to the holder.

In Japanese Unexamined Patent Application Publication No. 2000-208078, however, it is not adequate considered that repeated sliding of the bearing causes damage to the holder. Because high hardness materials are use for the bearing requiring durability, an edge of the bearing can cause damage to the holder made of relatively soft materials such as pure iron and/or the like. The damage of the holder becomes factors in interfering with the sliding of the bearing, and in impairing the function of the bearing. In recent years, especially, the dose of X rays required by the X-ray CT apparatus has been increased. Because of this, the weight of the anode is increasingly increased, and the damage caused to the holder by sliding of the bearing becomes greater.

SUMMARY OF THE INVENTION

It is accordingly an object of the present invention to provide an X-ray tube device capable of preventing damage to a holder holding a bearing and an X-ray CT apparatus including the X-ray tube device.

To achieve the above object, the present invention provides an X-ray tube device including: a cathode that produces an electron beam; an anode that produces X rays upon irradiation with the electron beam; a rotating portion that supports and rotates the anode; bearings that are placed at a predetermined distance from each other in a direction of a rotation axis of the rotating portion, each of the bearings having an outer ring and an inner ring between which rolling elements are sandwiched; and a holder that holds the outer rings. The holder has an inner wall that is spaced from an edge of the outer ring.

According to the present invention, provision of the X-ray tube device capable of preventing damage to the holder holding the bearing and the X-ray CT apparatus including the same is enabled.

DETAILED DESCRIPTION OF THE PREFERRED EMBODIMENTS

First Embodiment

Exemplary embodiments of an X-ray tube device and an X-ray CT apparatus according to the present invention will now be described with reference to the accompanying drawings. It is noted that throughout the following description and the accompanying drawings, like reference signs are used to indicate components/elements having like functional configurations for the purpose of avoiding repeated description.

Figure 1:
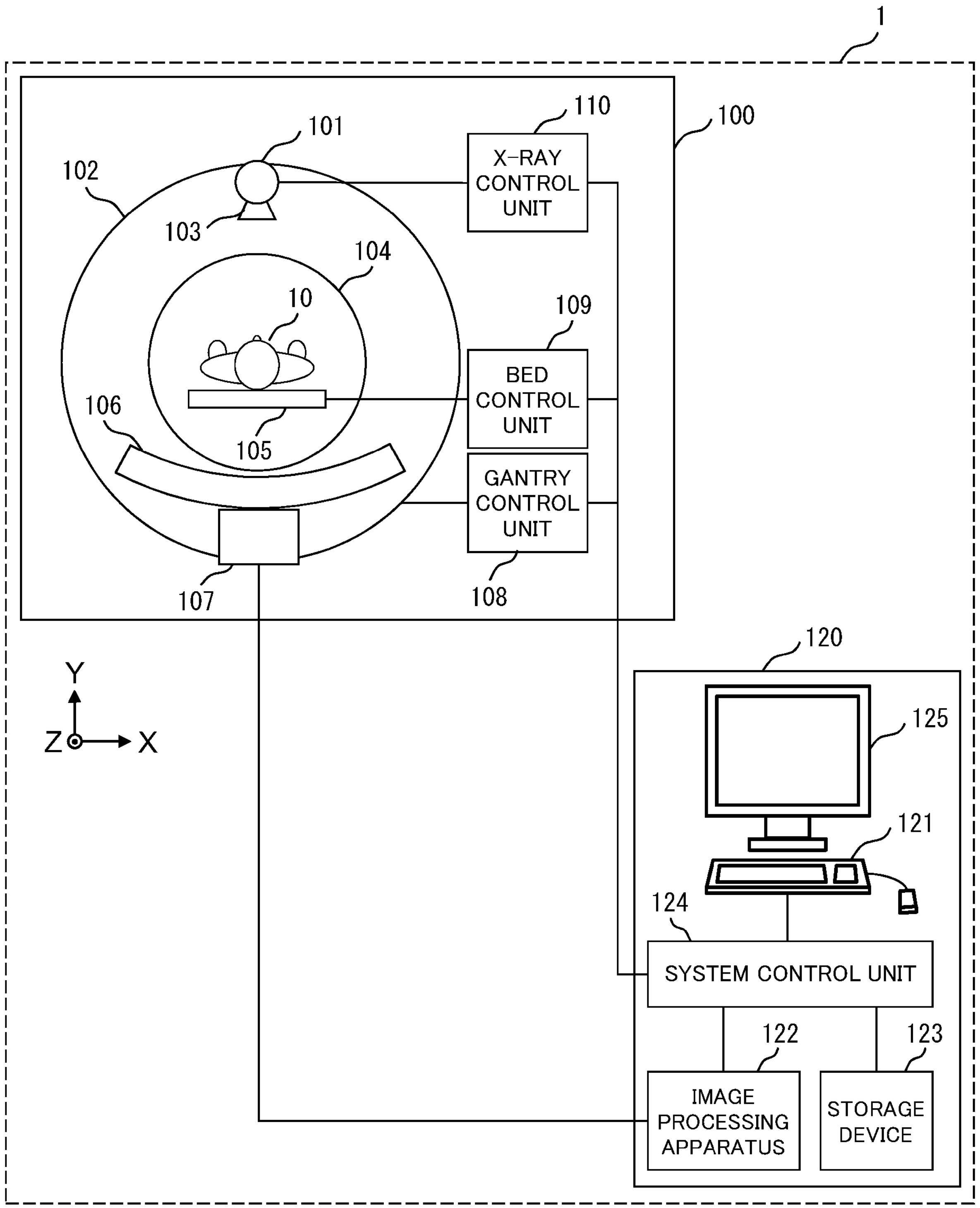
FIG. 1 is a diagram illustrating the overall configuration of an X-ray CT apparatus.

With reference to FIG. 1, the overall configuration diagram of an X-ray CT apparatus 1 is described. The X-ray CT apparatus 1 includes a scan gantry 100 and an operation unit 120.

The scan gantry 100 includes an X-ray tube device 101, a rotating disc 102, a collimator 103, an X-ray detector 106, a data collection device 107, a bed apparatus 105, a gantry control unit 108, a bed control unit 109, and an X-ray control unit 110. The X-ray tube device 101 irradiates with X rays an object 10 under examination laid on the bed apparatus 105. The collimator 103 limits the irradiation range of the X rays. The rotating disc 102 includes an opening 104 in which an object 10 under examination laid on the bed apparatus 105 goes. The rotating disc 102 is also equipped with the X-ray tube device 101 and the X-ray detector 106 and rotates the X-ray tube device 101 and the X-ray detector 106 around the object 10 under examination.

The X-ray detector 106 is disposed on the opposite side from the X-ray tube device 101 and detects the X rays passing through the object 10 under examination in order to measure spatial distribution of the transmitted X rays. The X-ray detector 106 has detection elements two-dimensionally arranged in the direction of rotation of the rotating disc 102 and in the direction of the rotation axis. The data collection device 107 collects as digital data a dose of X-rays detected by the X-ray detector 106. The gantry control unit 108 controls a rotation and inclination of the rotating disc 102.

The bed control unit 109 controls upward, downward, forward, backward, leftward, and rightward movements of the bed apparatus 105. The X-ray control unit 110 controls the electric power to be applied to the X-ray tube apparatus 101.

The operation unit 120 includes an input apparatus 121, an image processing apparatus 122, a display apparatus 125, a storage device 123, and a system control unit 124. The input apparatus 121 is an apparatus for entry of a name of the object 10 under examination, a date and time of examination, imaging conditions, and the like, specifically, is a keyboard, a pointing device, a touch panel, and/or the like. The image processing apparatus 122 performs arithmetic processing on measurement data delivered from the data collection device 107 to reconstruct a CT image, and performs a variety of image processing on the CT image. The display apparatus 125 displays the CT image generated in the image processing apparatus 122, and the like, specifically is a liquid crystal display, a touch panel, and/or the like. The storage device 123 stores data collected by the data collection device 107, CT images generated in the image processing apparatus 122, and the like, specifically is HDD (Hard Disk Drive) and/or the like. The system control unit 124 controls each part.

The X-ray control unit 110 controls power to be applied to the X-ray tube device 101 based on the imaging conditions input via the input apparatus 121, specifically, an X-ray tube voltage, an X-ray tube current, and/or the like, so that the X-ray tube device 101 irradiates the object 10 under examination with X rays depending on the imaging conditions. After X rays emitted from the X-ray tube device 101 have passed through the object 10 under examination, the X-ray detector 106 detects the X rays on the two-dimensionally arranged detection elements to measure a distribution of the transmitted X rays. The rotating disc 102 is controlled by the gantry control unit 108 to rotate based on the imaging conditions input through the input apparatus 121, specifically such as a rotation speed and the like. The bed apparatus 105 is controlled by the bed control unit 109 to operate based on based on the imaging conditions input through the input apparatus 121, specifically such as helix pitch.

By repeating the X-ray irradiation from the X-ray tube device 101 and the X-ray measurement by the X-ray detector 106 with rotation of the rotating disc 102, projection data at various angles is acquired and the acquired projection data is transmitted to the image processing apparatus 122. The image processing apparatus 122 performs back projection operation on the received projection data at various angles to reconstruct a CT image. The CT image thus reconstructed is displayed on the display apparatus 125.

Figure 2:
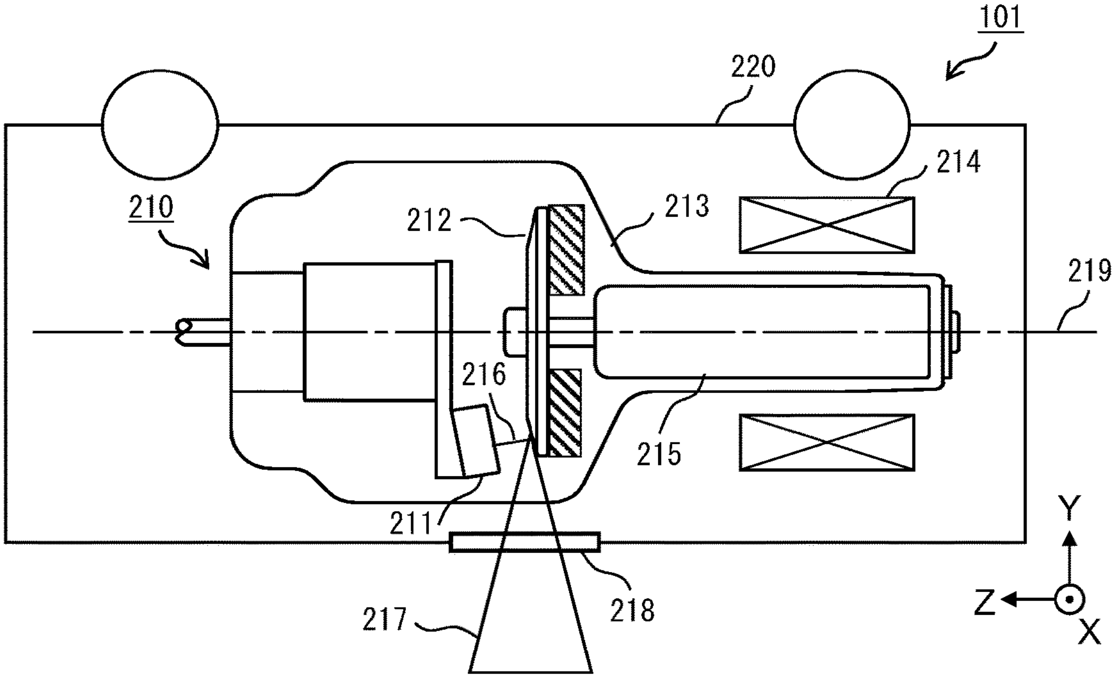
FIG. 2 is a diagram illustrating the overall configuration of an X-ray tube device.

With reference to FIG. 2, the configuration of the X-ray tube device 101 is described. The X-ray tube device 101 includes an X-ray tube 210 generating X rays and a housing case 220 housing the X-ray tube 210.

The X-ray tube 210 includes a cathode 211 that produces an electron beam, an anode 212 that is applied with a positive potential relative to the cathode 211, and an envelope 213 that holds the cathode 211 and the anode 212 in a vacuum atmosphere.

The cathode 211 includes a filament or a cold cathode and a focusing electrode. The filament, which is formed by winding high melting point materials such as tungsten and/or the like into coil form, emits electrons when it is heated by passage of current. The cold cathode is formed in a sharply pointed shape by using metal materials such as nickel, molybdenum and/or the like. The cold cathode emits electrons through field emission because an electric field focuses on the cathode surface. The focusing electrode creates a focusing electric field for focusing the emitted electrons toward the X-ray focal point on the anode 212. The filament or the cold cathode and the focusing electrode are at the same potential.

The anode 212 has a circular plate shape and includes a target and an anode base material. The target is formed of a material with a high atomic number and a high melting point such as tungsten and/or the like. By collision of the electrons emitted from the cathode 211 with the X-ray focal point on the target, X rays 217 is radiated from the X-ray focal point. The anode base material is made of a material with high thermal conductivity such as copper and/or the like, and holds the target. The target and the anode base material are at the same potential.

The envelope 213 holds the cathode 211 and the anode 212 in a vacuum atmosphere in order to provide electrical isolation between the cathode 211 and the anode 212. The envelope 213 is at ground potential.

The electrons emitted from the cathode 211 are accelerated into an electron beam by a voltage applied between the cathode and the anode. The X rays 217 are produced from the X-ray focal point when the electron beam 216 is focused by the focusing electric field to collide with the X-ray focal point on the target. Energy of the X rays 217 to be produced depends on a voltage applied between the cathode and the anode, i.e., a tube voltage. A dose of the X rays 217 to be produced depends on the quantity of electrons emitted from the cathode, i.e., a tube current, and a tube voltage.

The percentage of the energy of the electron beam 216 converted into X rays is merely on the order of 1%, and almost all of the remaining energy turns to heat. In the X-ray tube device 101 mounted on the medical X-ray CT apparatus 1, the tube voltage is one hundred and several tens of kV and the tube current is several hundreds of mA. Therefore, the anode 212 is heated by the amount of heat of several tens of kW. In order to prevent the anode 212 from overheating and melting due to such heating, the anode 212 is connected to a rotor support 215 so that the anode 212 is rotated about a rotation axis 219 indicated by a dot-and-dash line in FIG. 2 by driving of the rotor support 215. The rotor support 215 is driven by using a magnetic field caused by the exciting coil 214 as a rotation driving force. Rotating the anode 212 causes constant movement of the X-ray focal point which is an area with which the electron beam 216 collides. Because of this, the X-ray focal point can be maintained at temperatures below the melting point of the target, so that the anode 212 can be prevented from overheating and melting.

The X-ray tube 210 and the exciting coil 214 are housed in the housing case 220. The interior of the housing case 220 is filled with insulating oil which serves as a cooling medium and electrically isolates the X-ray tube 210. The insulating oil filling the interior of the housing case 220 is guided to a cooler via piping connected to the housing case 220 of the X-ray tube device 101, and then is returned via the piping to the housing case 220 after heat dissipation at the cooler.

Due to the heat produced at the X-ray focal point, an average temperature of the anode 212 reaches on the order of 1000° C. Much of the produced heat is dispersed on the envelope 213 by radiation from the surface of the anode 212, and the remaining heat flows to the envelope 213 via the rotor support 215 due to heat conduction. The housing case 220 includes a radiation window 218 for emitting the X rays 217 to the outside of the X-ray tube device 101. The radiation window 218 is formed of materials with a low atomic number and a high X-ray transmittance such as beryllium.

Figure 3:
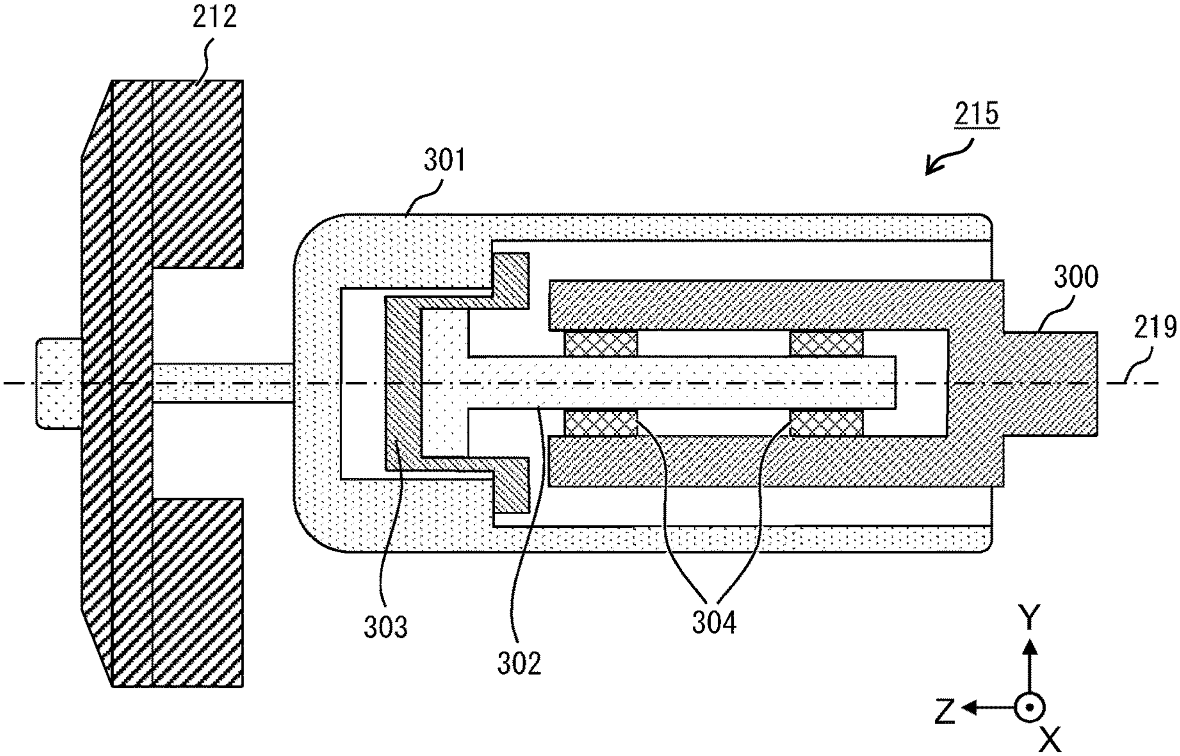
FIG. 3 is a diagram illustrating the structure around an anode.

With reference to FIG. 3, the rotor support 215 connected to the anode 212 is described. FIG. 3 is a diagram illustrating the structure around the anode 212, which is a cross-sectional view taken along the rotation axis 219. The rotor support 215 is connected to the other side of the anode 212 from the cathode 211 facing the anode 212. The rotor support 215 includes a fixed portion 300, bearings 304, a rotating portion 302, a rotation cylinder portion 301, and a fastener 303.

The fixed portion 300 has a shape closed at one end of the cylinder, and the closed end portion of the fixed portion 300 is supported by the envelope 213. The bearings 304 are placed within the cylinder of the fixed portion 300.

The bearings 304 are members that support the rotating portion 302 in such a manner as to be rotatable relatively to the fixed portion 300, and are placed at a predetermined distance from each other along the direction of the rotation axis 219. Details of the structure of the bearing 304 will be described later with reference to FIG. 4A and FIG. 4B.

The rotating portion 302 has a stepped cylindrical shape, and is located within the cylinder of the fixed portion 300. The rotating portion 302 is supported by the bearings 304 in a such a manner as to be rotatable relatively to the fixed portion 300. The rotation cylinder portion 301 is connected via the fastener 303 to the rotating portion 302, and in turn the anode 212 is connected to the rotation cylinder portion 301. Specifically, the rotating portion 302 supports the anode 212.

The rotation cylinder portion 301 has a shape closed at one end of the cylinder, and the fixed portion 300 and the rotating portion 302 are placed within the rotation cylinder portion 301. The rotation cylinder portion 301 rotates about the rotation axis 219 by using a magnetic field caused by the exciting coil 214 as a driving force. As the rotation cylinder portion 301 rotates, the anode 212 and the rotating portion 302, which are connected to the rotation cylinder portion 301, also rotate.

The fastener 303 is a member for connection between the rotation cylinder portion 301 and the rotating portion 302, and has a hat shape to provide a longer heat transfer path from the anode 212 to the rotating portion 302. An increase in length of a heat transfer path leads to inhibition of heat transfer from the anode 212 to the rotating portion 302.

Figure 4A:
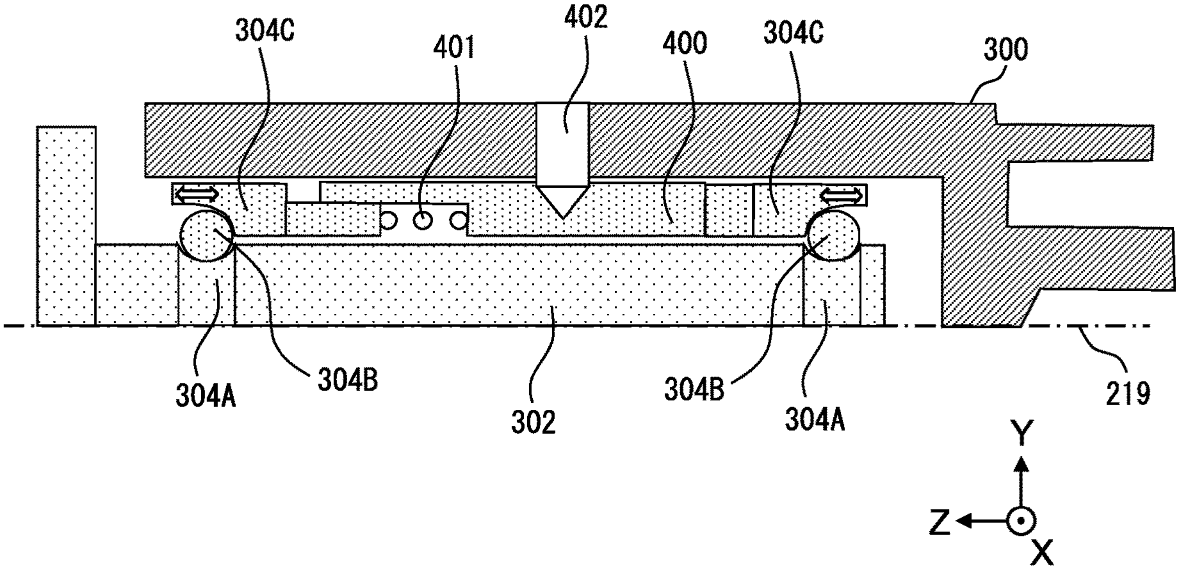
FIG. 4A is a diagram illustrating an example structure of a rotation support.
Figure 4B:
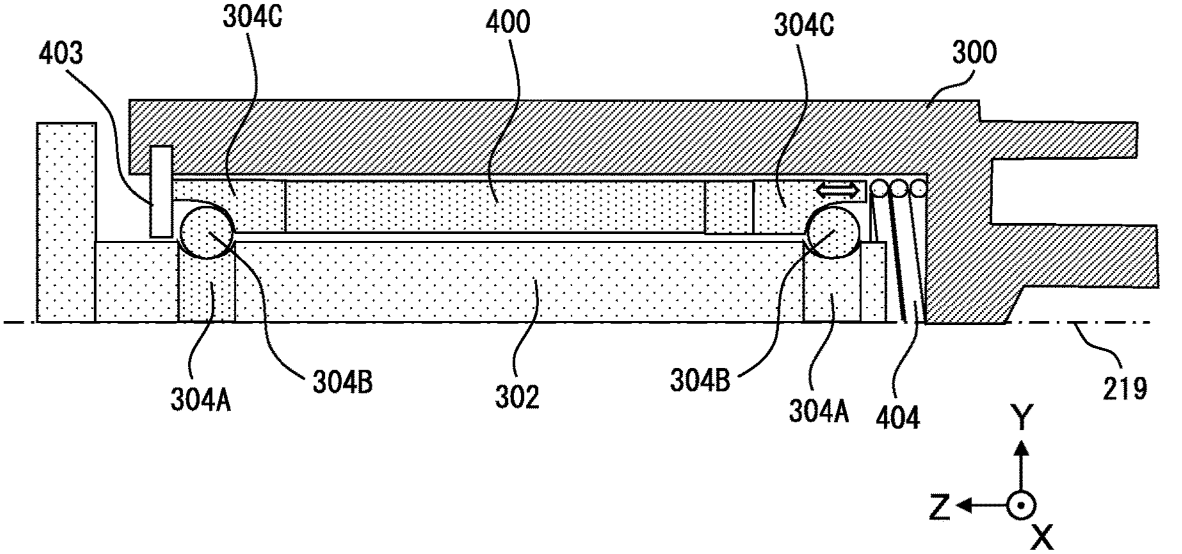
FIG. 4B is a diagram illustrating an example structure of the rotation support.

With reference to FIG. 4A and FIG. 4B, details of the structure of each bearing 304 included in the rotor support 215 is described. The bearing 304 has an inner ring 304A, rolling elements 304B, and an outer ring 304C. The rolling elements 304B are ball members, and a plurality of rolling members 304B are arranged in a circumferential direction of the rotating portion 302, and sandwiched between the inner ring 304A and the outer ring 304B. The inner ring 304A and the outer ring 304C are members respectively having races between which the rolling elements 304B roll. The inner ring 304A is located closer to the rotation axis 219, and the outer ring 304C is located farther from the rotation axis 219. The inner ring 304A may be installed in the rotating portion 302 as illustrated in FIG. 4A and FIG. 4B. The outer ring 304C is held by the fixed portion 300. In short, the fixed portion 300 serves as a holder for holding the outer ring 304C. To ensure durability required of the inner ring 304A, the rolling elements 304B, and the outer ring 304C, high hardness materials such as used for high speed tool steel are used, for example, an SKH material and the like.

The bearings 304 are placed at a predetermined distance from each other along the direction of the rotation axis 219 as described above. In FIG. 4A, a spacer 400 is secured to the fixed portion 300 with a screw 402, and the spacer 400 and a preload spring 401 are placed together between the two bearings 304. As illustrated in FIG. 4A, the preload spring 401 may be placed closer to the anode 212 than the screw 402 is located, or alternatively may be placed farther away from the anode 212 than the screw 402 is located. Alternatively, preload springs 401 may be placed on both sides of the screw 402. In FIG. 4B, the two bearings 304 are spaced at a predetermined distance by the spacer 400 and placed between a retaining ring 403 and a spring 404.

The rotating portion 302 repeatedly experiences thermal expansion caused by heat transfer from the anode 212 and thermal contraction caused when the heat transfer stops. This increases and decreases the distance between the two inner rings 304A. Thus, the outer rings 304C follows the inner ring 304A to slide in the directions of arrows illustrated in FIG. 4A and FIG. 4B. Sliding of the outer ring 304C can cause abrasion of lubricant between the fixed portion 300 and the outer ring 304C, and/or cause damage to the inner wall of the fixed portion 300 made of relatively soft materials such as pure iron. The damage to the inner wall of the fixed portion 300 becomes factors in interfering with the sliding of the outer ring 304C, and in causing a gap between the rolling elements 304B and the inner ring 304A and/or the outer ring 304C to fall outside a normal range, and finally in impairing the function of the bearing 304. To avoid this, in the first embodiment, the inner wall of the fixed portion 300 is spaced from an edge of the outer ring 304C to prevent damage to the fixed portion 300.

Figure 5A:
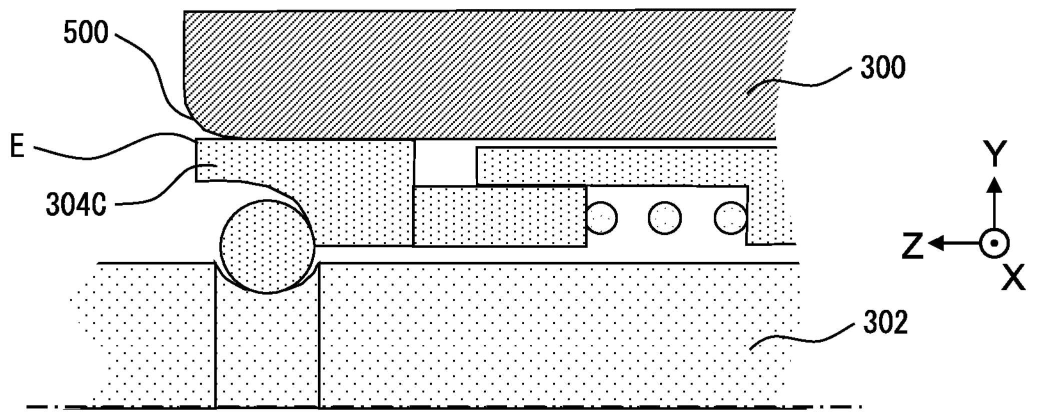
FIG. 5A is a diagram illustrating an example structure around an outer ring according to a first embodiment.
Figure 5B:
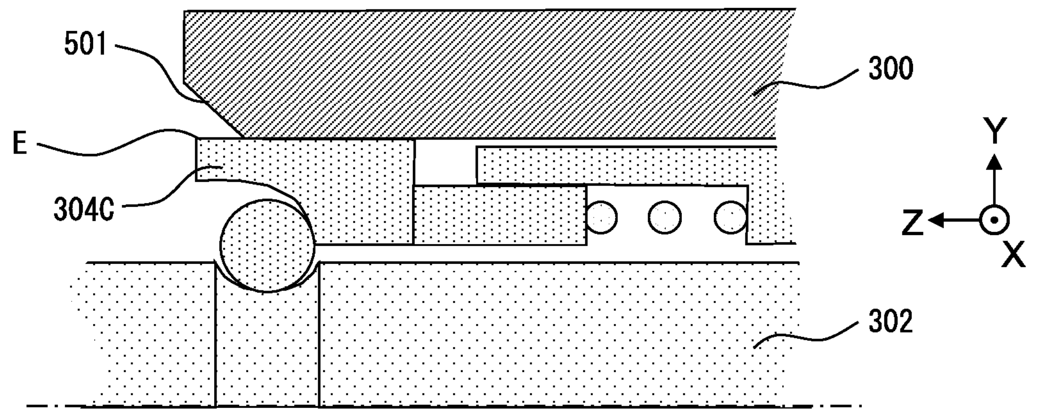
FIG. 5B is a diagram illustrating another example structure around an outer ring according to the first embodiment.
Figure 5C:
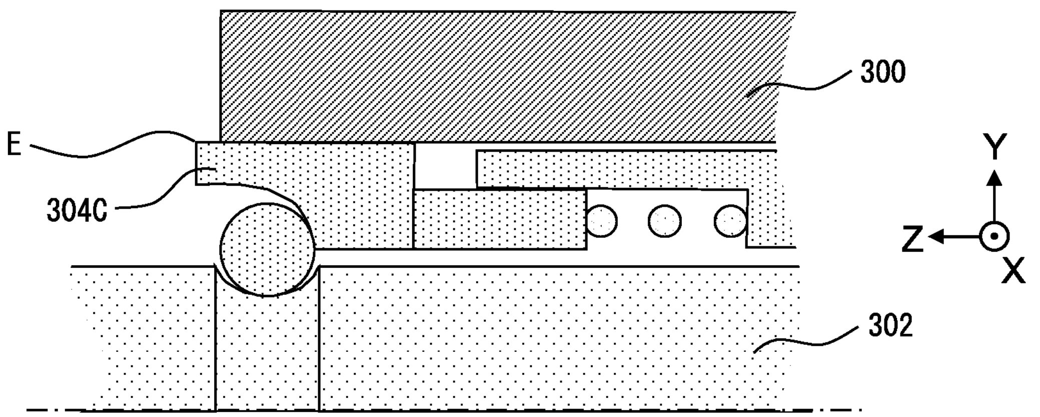
FIG. 5C is a diagram illustrating a yet another example structure around an outer ring according to the first embodiment.

With reference to FIG. 5A to FIG. 5C, examples of the structure around the outer ring 304C according to the first embodiment are described. In FIG. 5A, for spacing the inner wall of the fixed portion 300 from an edge E of the outer ring 304C, an R portion 500 is formed on an end portion of the fixed portion 300. The R portion 500 is formed by rounding off an edge of the end portion of the fixed portion 300 to extend across the area in which the edge E of the outer ring 304C slides in the direction of the rotation axis 219, so that even when the outer ring 304C slides, the edge E thereof is kept from contact with the inner wall of the fixed portion 300. Stated another way, in the direction of the rotation axis 219, the fixed portion 300 is formed such that the length of the contact surface between the outer ring 304C and the fixed portion 300 is shorter than the length of the outer ring 304C.

In FIG. 5B, a chamfered portion 501 is formed on the end portion of the fixed portion 300. The chamfered portion 501 is formed by chamfering an edge of the end portion of the fixed portion 300 to extend across the area in which the edge E of the outer ring 304C slides in the direction of the rotation axis 219 as in the case of the R portion 500. That is, in FIG.

5B, in the direction of the rotation axis 219, the fixed portion 300 is also formed such that the length of the contact surface between the outer ring 304C and the fixed portion 300 is shorter than the length of the outer ring 304C.

In FIG. 5C, the fixed portion 300 is formed such that the outer ring 304C extends out from the end portion of fixed portion 300 in the direction of the rotation axis 219. Stated another way, in the direction of the rotation axis 219, the fixed portion 300 is positioned lower than the outer ring 304C. It is noted that, in FIG. 5C, in the direction of the rotation axis 219, the length of the contact surface between the outer ring 304C and the fixed portion 300 is shorter than the length of the outer ring 304C.

With the structures illustrated in FIG. 5A to FIG. 5C, the inner wall of the fixed portion 300 is spaced from the edge E of the outer ring 304C, so that the inner wall of the fixed portion 300 may be kept from contact with the edge E of the outer ring 304C. Thus, the fixed portion 300 may be prevented from suffering damage. FIG. 5A to FIG. 5C describe the shape of the end portion of the fixed portion 300 located closer to the anode 212. The edge E of the outer ring 304C can come into contact with a part other than the end portion of the fixed portion 300. Therefore, the inner wall structure of the fixed portion 300 will be described below.

Figure 6A:
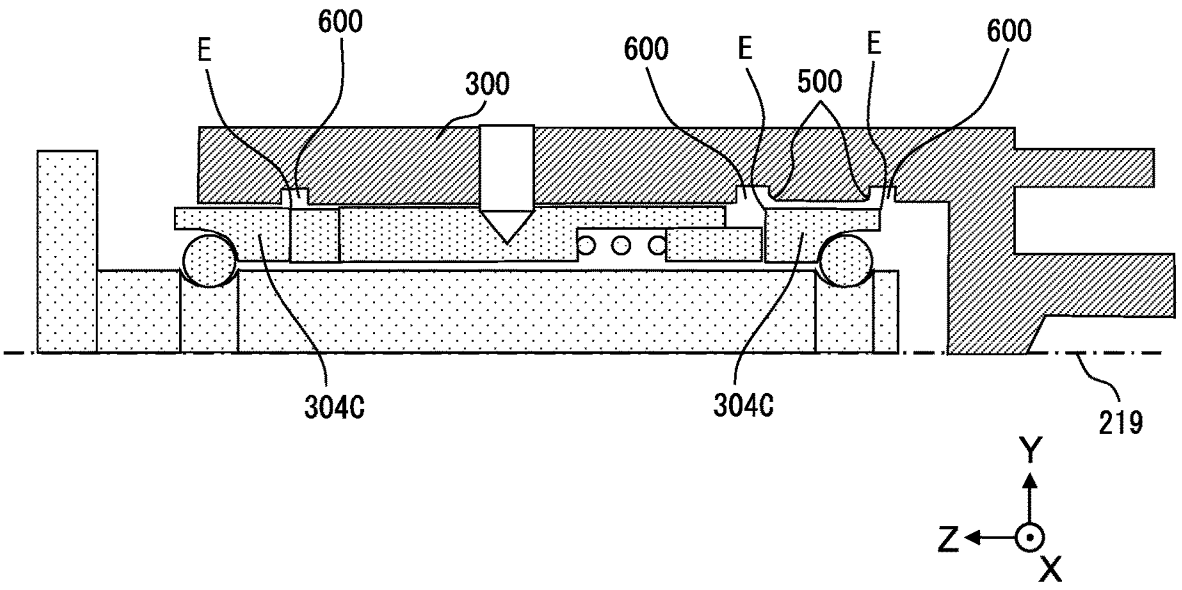
FIG. 6A is a diagram illustrating an example structure of an inner wall of a fixed portion according to the first embodiment.
Figure 6B:
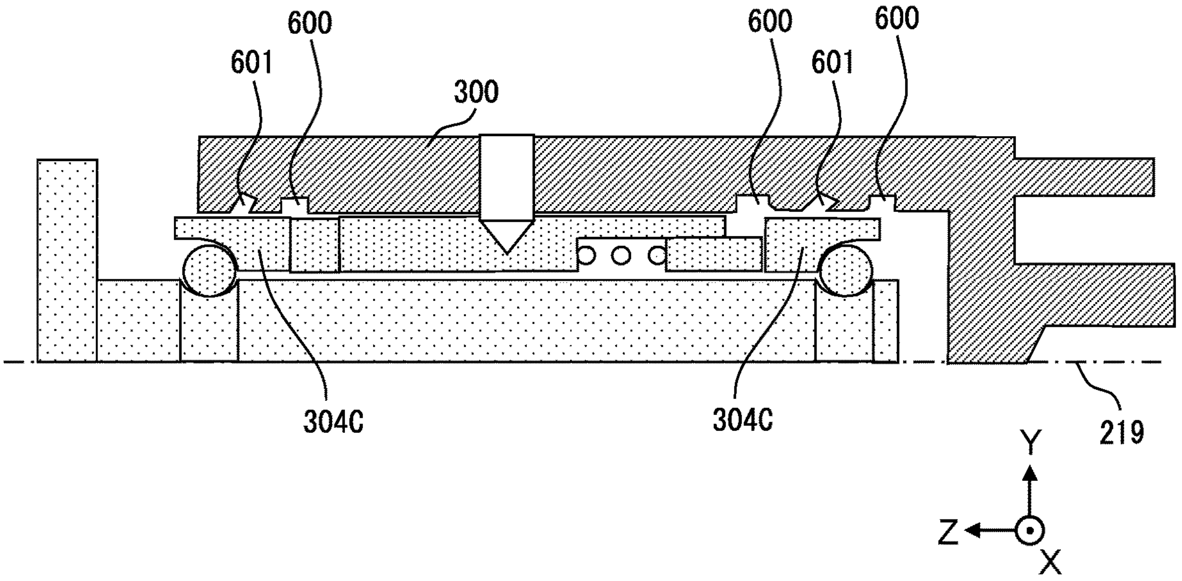
FIG. 6B is a diagram illustrating another example structure of an inner wall of a fixed portion according to the first embodiment.

With reference to FIG. 6A and FIG. 6B, examples of the inner wall structure of the fixed portion 300 according to the first embodiment are described. In FIG. 6A, grooves 600 are installed in the inner wall of the fixed portion 300. The groove 600 is provided across the area in which each of the edges E of the outer ring 304C slides in the direction of the rotation axis 219. As a result, even when the outer ring 304C slides, the edges E may be kept from contact with the inner wall of the fixed portion 300. Thus, the fixed portion 300 may be prevented from suffering damage. It is noted that the R portion 500 may be formed in an end portion of the groove 600.

In FIG. 6B, foreign matter collecting portions 601, together with the grooves 600, are installed in the inner wall of the fixed portion 300. The foreign matter collecting portion 601 is a groove formed approximately in the center of the contact surface between the fixed portion 300 and the outer ring 304C in the direction of the rotation axis 219 in order to collect foreign matters originating on the contact surface. The foreign matter originating on the contact surface of the fixed portion 300 is, for example, the lubricant coming off the contact surface, which then hinders the outer ring 304C from sliding. In other words, the foreign matter collecting portion 601 collects foreign matters, thereby maintaining smooth sliding of the outer ring 304C. The foreign matter collecting portion 601 is preferably a groove inclined with respect to a direction perpendicular to the rotation axis 219. The foreign matter collecting portion 601 is configured as an inclined groove, thereby facilitating accumulation of the collected foreign matters within the foreign matter collecting portion 601.

According to the first embodiment described above, the edges E of the sliding outer rings 304C may be kept from contact with the inner wall of the fixed portion 300, so that the fixed portion 300 is prevented from suffering damage. As a result, the functions of the bearings 304 may be maintained.

Second Embodiment

In the first embodiment the case where the outer ring 304C of the bearing 304 is held by the fixed portion 300 has been described. In a second embodiment, the case where the outer ring 304C is held by the rotating portion 302 is described. The configuration in the second embodiment is identical with that in the first embodiment, except for the fixed portion 300, the rotating portion 302, and the bearing 304, and a description is omitted.

Figure 7:
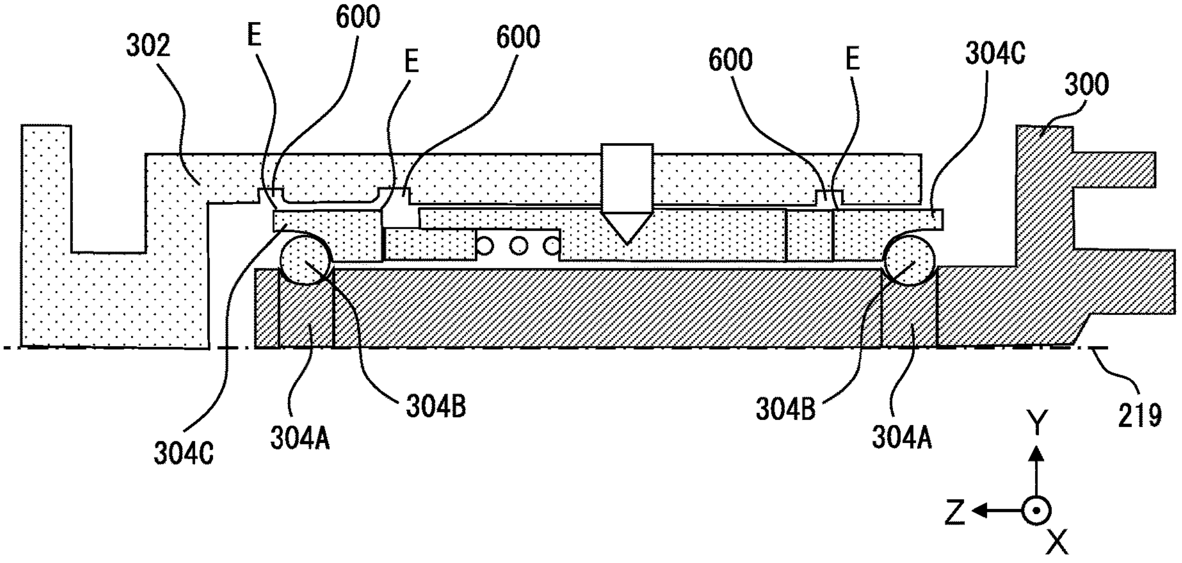
FIG. 7 is a diagram illustrating an example structure of an inner wall of a rotation cylinder portion according to a second embodiment.

With reference to FIG. 7, an example structure of the fixed portion 300, the rotating portion 302, and the bearings 304 according to the second embodiment is described. The fixed portion 300 has a cylindrical shape, in which the inner rings 304A of the bearings 304 are placed at a predetermined distance from each other in the direction of the rotation axis 219.

The rotating portion 302 has a shape closed at one end of the cylinder. The fastener 303 is connected to the closed end portion of the rotating portion 302, and the rotating portion 302 supports the anode 212 via the fastener 303 and rotation cylinder portion 301. The bearings 304 are placed inside the cylinder of the rotating portion 302 and at a predetermined distance from each other in the direction of the rotation axis 219. The outer rings 304C of the bearings 304 are held by the rotating portion 302. In short, the rotating portion 302 serves as a holder for holding the outer rings 304C.

The grooves 600 are installed in the inner wall of the cylinder of the rotating portion 302. The groove 600 extends across the area in which each of the edges E of the outer rings 304C slides relative to the rotating portion 302 in the direction of the rotation axis 219 due to the thermal expansion and contraction of the rotating portion 302. As a result, even when the outer rings 304C slide relative to the rotating portion 302, the edges E may be kept form contact with the inner wall of the rotating portion 302. Thus, the rotating portion 302 may be prevented from suffering damage.

According to the second embodiment described above, the edges E of the sliding outer rings 304C may be kept from contact with the inner wall of the rotating portion 302 serving as the holder for holding the outer rings 304C, so that the rotating portion 302 serving as the holder may be prevented from suffering damage. As a result, the functions of the bearings 304 may be maintained.

Several embodiments according to the present invention have been described. It is to be understood that the present invention is not limited to the above embodiments and may be embodied by modifying components thereof without departing from the spirit or scope of the present invention. Further, a plurality of components disclosed in the above embodiments may be combined as appropriate. Further, several components of all the components described in the above embodiments may be omitted.

REFERENCE SIGNS LIST

1 . . . X-ray CT apparatus
10 . . . object under examination
100 . . . scan gantry
101 . . . X-ray tube device
102 . . . rotating disc
103 . . . collimator
104 . . . opening
105 . . . bed apparatus
106 . . . X-ray detector
107 . . . data collection device
108 . . . gantry control unit
109 . . . bed control unit
110 . . . X-ray control unit
120 . . . operation unit
121 . . . input apparatus
122 . . . image processing apparatus

123 . . . storage device
124 . . . system control unit
125 . . . display apparatus
210 . . . X-ray tube
211 . . . cathode
212 . . . anode
213 . . . envelope
214 . . . exciting coil
215 . . . rotor support
216 . . . electron beam
217 . . . X rays
218 . . . radiation window
219 . . . rotation axis
220 . . . housing case
300 . . . fixed portion
301 . . . rotation cylinder portion
302 . . . rotating portion
303 . . . fastener
304 . . . bearing
304A . . . inner ring
304B . . . rolling element
304C . . . outer ring
400 . . . spacer
401 . . . preload spring
402 . . . screw
403 . . . retaining ring
404 . . . spring
500 . . . R portion
501 . . . chamfered portion
600 . . . groove
601 . . . foreign matter collecting portion

What is claimed is:

1. An X-ray tube device, comprising:
- a cathode that produces an electron beam;
- an anode that produces X rays upon irradiation with the electron beam;
- a rotating portion that supports and rotates the anode;
- bearings that are placed at a predetermined distance from each other in a direction of a rotation axis of the rotating portion, each of the bearings having an outer ring and an inner ring between which rolling elements are sandwiched; and
- a holder that holds the outer rings,
- wherein the holder has an inner wall that is spaced from an edge of the outer ring,
- wherein the inner wall of the holder is installed with a foreign matter collecting portion to collect foreign matters originating on a contact surface between the holder and the outer ring, and
- wherein the foreign matter collecting portion is a groove located approximately in the center of the contact surface in the direction of the rotation axis.

2. The X-ray tube device according to claim 1, wherein the holder has an R portion formed by rounding off an edge of an end portion of the holder.

3. The X-ray tube device according to claim 1, wherein the holder has a chamfered portion formed by chamfering an edge of an end portion of the holder.

4. The X-ray tube device according to claim 1, wherein the holder has an end portion positioned lower than the outer ring in the direction of the rotation axis.

5. The X-ray tube device according to claim 1, wherein in the direction of the rotation axis, a length of a contact surface between the holder and the outer ring is shorter than a length of the outer ring.

6. The X-ray tube device according to claim 1, wherein one or more additional grooves are installed in the inner wall of the holder, to extend across an area in which the edge of the outer ring slides in the direction of the rotation axis.

7. An X-ray CT apparatus, comprising:
- an X-ray detector; and
- an X-ray tube device disposed on an opposite side from the X-ray detector, the X-ray tube device comprising:
  - a cathode that produces an electron beam;
  - an anode that produces X rays upon irradiation with the electron beam;
  - a rotating portion that supports and rotates the anode;
  - bearings that are placed at a predetermined distance from each other in a direction of a rotation axis of the rotating portion, each of the bearings having an outer ring and an inner ring between which rolling elements are sandwiched; and
  - a holder that holds the outer rings,
- wherein the holder has an inner wall that is spaced from an edge of the outer ring,
- wherein the inner wall of the holder is installed with a foreign matter collecting portion to collect foreign matters originating on a contact surface between the holder and the outer ring, and
- wherein the foreign matter collecting portion is a groove located approximately in the center of the contact surface in the direction of the rotation axis.

8. The X-ray CT apparatus according to claim 7, wherein the holder has an R portion formed by rounding off an edge of an end portion of the holder.

9. The X-ray CT apparatus according to claim 7, wherein the holder has a chamfered portion formed by chamfering an edge of an end portion of the holder.

10. The X-ray CT apparatus according to claim 7, wherein the holder has an end portion positioned lower than the outer ring in the direction of the rotation axis.

11. The X-ray CT apparatus according to claim 7, wherein in the direction of the rotation axis, a length of a contact surface between the holder and the outer ring is shorter than a length of the outer ring.

12. The X-ray CT apparatus according to claim 7, wherein one or more additional grooves are installed in the inner wall of the holder, to extend across an area in which the edge of the outer ring slides in the direction of the rotation axis.

* * * * *